(12) United States Patent
Long et al.

(10) Patent No.: US 7,651,427 B2
(45) Date of Patent: Jan. 26, 2010

(54) ELECTRO-HYDRAULIC CONTROL SYSTEM WITH MULTIPLEXED PRESSURE SWITCH DIAGNOSTIC SYSTEM

(75) Inventors: Charles F. Long, Pittsboro, IN (US); Bryan H. Hagelskamp, Carmel, IN (US)

(73) Assignee: GM Global Trechnology Operations, Inc., Detroit, MI (US)

( * ) Notice: Subject to any disclaimer, the term of this patent is extended or adjusted under 35 U.S.C. 154(b) by 431 days.

(21) Appl. No.: 11/626,524

(22) Filed: Jan. 24, 2007

(65) Prior Publication Data
US 2008/0176700 A1 Jul. 24, 2008

(51) Int. Cl.
*F16H 31/00* (2006.01)

(52) U.S. Cl. .................. 475/120; 475/121; 475/123

(58) Field of Classification Search ............... 475/116, 475/118, 120–123; 477/130, 131
See application file for complete search history.

(56) References Cited
U.S. PATENT DOCUMENTS

| | | | |
|---|---|---|---|
| 6,520,881 B1 * | 2/2003 | Long et al. | 475/119 |
| 7,288,039 B2 * | 10/2007 | Foster et al. | 475/5 |
| 7,322,899 B1 * | 1/2008 | Long et al. | 475/116 |
| 7,395,837 B2 * | 7/2008 | Foster et al. | 137/557 |
| 2007/0117671 A1 * | 5/2007 | Long et al. | 475/116 |
| 2009/0075772 A1 * | 3/2009 | Ellis et al. | 475/31 |

* cited by examiner

*Primary Examiner*—Ha D. Ho

(57) ABSTRACT

An electro-hydraulic control system is provided with a diagnostic system that uses extensive multiplexing of pressure switches to reduce the number of required components. The control system includes a controller with a pressure switch diagnostic system having first, second, third and fourth pressure switches each having a high and a low logic state, first and second logic valves each movable between a respective first position and second position, and first, second, third and fourth trim valves each movable between a respective first position and second position. The pressure switches are multiplexed to report one of the high and low logic state to the controller in accordance with a relatively high and low fluid pressure, respectively, at different ones of the trim valves and logic valves, thereby enabling a determination of a change in or failure to change position of the respective the trim valves or logic valves.

14 Claims, 4 Drawing Sheets

| Range | Exhaust | Steady State Conditions | | | | 144 | N/H PCS1 | N/L PCS2 | N/L PCS3 | N/L PCS4 | N/L PCS6 | N/H PCS7 | N/H PCS5 |
|---|---|---|---|---|---|---|---|---|---|---|---|---|---|
| | | W Valve | X Valve | Y Valve | Z Valve | | | | | | | | |
| R2 | C3/C4/C5 | 0 | 0 | 0 | 0 | R | C1 | C2 | C7 | TCC | C6 | - | MM |
| R1 | C3/C4/C5 | 0 | 0 | 0 | 0 | R | C1 | C2 | C7 | TCC | C6 | - | MM |
| Startup | C1/C3/C5 | 0 | 1 | 0 | 0 | R | C4 | C2 | C7 | TCC | C6 | - | MM |
| N | C3/C4/C5 | 0 | 0 | 0 | 0 | R | C1 | C2 | C7 | TCC | C6 | - | MM |
| 1st | C3/C4/C5 | 0 | 0 | 0 | 0 | R | C1 | C2 | C7 | TCC | C6 | - | MM |
| 1st' | C4/C5 | 0 | 0 | 0 | 1 | F | C1 | C2 | C7 | TCC | C6 | C7 | MM |
| 2nd | C4/C5 | 0 | 0 | 0 | 1 | F | C1 | C2 | C3 | TCC | C6 | C7 | MM |
| 3rd | C4/C5 | 0 | 0 | 1 | 1 | F | C1 | C2 | C3 | TCC | C6 | C7 | MM |
| 3rd' | C2/C4 | 0 | 0 | 1 | 1 | F | C1 | C2 | C3 | TCC | C6 | C7 | MM |
| 4th | C2/C4 | 0 | 0 | 0 | 1 | F | C1 | C5 | C3 | TCC | C6 | C7 | MM |
| 5th | C2/C4 | 0 | 0 | 0 | 1 | F | C1 | C6 | C3 | TCC | C6 | C7 | MM |
| 5th' | C4/C5 | 0 | 0 | 0 | 1 | F | C1 | C2 | C3 | TCC | C6 | C7 | MM |
| 6th | C4/C5 | 0 | 1 | 0 | 1 | F | C1 | C2 | C3 | TCC | C6 | C7 | MM |
| 7th | C4/C5 | 0 | 1 | 1 | 1 | F | C1 | C2 | C3 | TCC | C6 | C7 | MM |
| 7th' | C2/C4 | 0 | 1 | 1 | 1 | F | C1 | C5 | C3 | TCC | C6 | C7 | MM |
| 7th'' | C1/C2/C6 | 1 | 1 | 1 | 1 | N | C4 | C5 | C3 | TCC | - | C7 | MM |
| 7th''' | C1/C2/C6 | 0 | 1 | 1 | 1 | N | C1 | C2 | C3 | TCC | - | C7 | MM |
| 8th | C1/C2/C6 | 0 | 1 | 1 | 1 | N | C4 | C5 | C3 | TCC | - | C7 | MM |
| 9th | C1/C2/C6 | 1 | 1 | 1 | 1 | N | C4 | C5 | C3 | TCC | - | C7 | MM |

FIG. 3

ELECTRO-HYDRAULIC CONTROL SYSTEM WITH MULTIPLEXED PRESSURE SWITCH DIAGNOSTIC SYSTEM

TECHNICAL FIELD

The invention relates to an electro-hydraulic control system for a transmission; specifically, an electro-hydraulic control system having a multiplexed pressure switch diagnostic system.

BACKGROUND OF THE INVENTION

Multi-speed power transmissions, particularly those using planetary gear arrangements, require a hydraulic system to provide controlled engagement and disengagement, on a desired schedule, of the clutches and brakes or torque-transmitting mechanisms that operate to establish the ratios within the planetary gear arrangement.

These control systems have evolved from substantially pure hydraulic control systems, wherein all of the control signals are produced by hydraulic devices, to electro-hydraulic control systems, wherein a number of the control signals are produced by an electronic controller. The electronic controller emits electrical control signals to solenoid valves, which then issue controlled hydraulic signals to the various operating valves within the transmission control.

With many of the early pure hydraulic and first generation electro-hydraulic control systems, the power transmission utilized a number of freewheel or one-way devices which smooth the shifting or ratio interchange of the transmission during both upshifting and downshifting of the transmission. This relieves the hydraulic control system from providing for the control of overlap between the torque-transmitting mechanism that was coming on and the torque-transmitting mechanism that was going off. If this overlap is excessive, the driver feels a shudder in the drivetrain, and if the overlap is too little, the driver experiences engine flare or a sense of coasting. The freewheel device prevents this feeling by quickly engaging when the torque imposed thereon is reversed from a freewheeling state to a transmitting state.

The advent of electro-hydraulic devices gave rise to what is known as clutch-to-clutch shift arrangements to reduce the complexity of the transmission and the control. These electro-hydraulic control mechanisms are generally perceived to reduce cost and reduce the space required for the control mechanism.

In addition, with the advent of more sophisticated control mechanisms, the power transmissions have advanced from two-speed or three-speed transmissions to five-speed and six-speed transmissions. In at least one presently available six-speed transmission, just five friction devices are employed to provide six forward speeds, neutral condition, and a reverse speed.

Countershaft transmissions are often a desirable design option as they typically have low spin losses and offer wide ratio coverage. The relatively large number of clutches sometimes associated with countershaft transmissions may require double transition shifts. To reduce the number of components to the extent possible, clutches are sometimes reused in different speed ratio ranges.

SUMMARY OF THE INVENTION

It is desirable to provide diagnostic capabilities to determine if an electro-hydraulic control system is operating as commanded by a controller, and to ensure prompt adjustment in the event of a failure to operate as desired.

An electro-hydraulic control system is provided with a diagnostic system that uses extensive multiplexing of pressure switches to provide accurate information regarding the position of valves within the control system while minimizing the number of required components. The pressure switch diagnostic system has first, second, third and fourth pressure switches, each having a high and a low logic state. The electro-hydraulic control system further includes first and second logic valves as well as first, second, third and fourth trim valves, each movable between a respective first and second position. Two of the pressure switches each report the high or the low logic state to the controller in accordance with a relatively high or a relatively low fluid pressure at a respective one of two of the trim valves corresponding with the position of the respective trim valve and the position of the first logic valve; i.e., these two pressure switches are multiplexed to determine the positions of the two trim valves and of the first logic valve. The other two pressure switches also each report a high or a low logic state in accordance with the relative fluid pressure at a respective one of the other two trim valves, corresponding with the positions of these two respective trim valves and the position of the second logic valve, i.e., these two pressure switches are multiplexed to determine the positions of the other two trim valves and of the second logic valve. As used herein, switches are "multiplexed" when they have more than one function, such as when they are able to report logic states corresponding with the position of more than one valve. Traditionally, a separate pressure switch is required for each valve; accordingly the electro-hydraulic control system minimizes the number of required components and associated cost, packaging space requirements and assembly time.

The electro-hydraulic control system may include a three position dog-clutch actuator valve selectively movable between three positions to control movement of a three-position dog clutch. Fifth and sixth pressure switches are provided in the diagnostic system to report a combination of logic states indicative of the position of the dog clutch actuator valve. Preferably, the controller is operable to determine whether the reported logic states of the pressure switches are consistent with those corresponding with positions commanded by the controller to achieve a desired speed ratio.

The electro-hydraulic control system may further include a fifth trim valve and a third logic valve, with a corresponding seventh and eighth pressure switch used to report one of a high and a low logic state to the controller corresponding with the positions of these respective valves.

Preferably, the electro-hydraulic control system is used with a transmission having seven torque-transmitting mechanisms in addition to the dog clutch that are selectively engagable to achieve at least nine forward and two reverse speed ratios without using any pressure switches in addition to the eight pressure switches described above.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a table indicating the state of many of the valves shown in FIGS. 2A and 2B for each speed ratio achievable by the transmission of FIG. 1.

DESCRIPTION OF THE PREFERRED EMBODIMENTS

Figure 1:
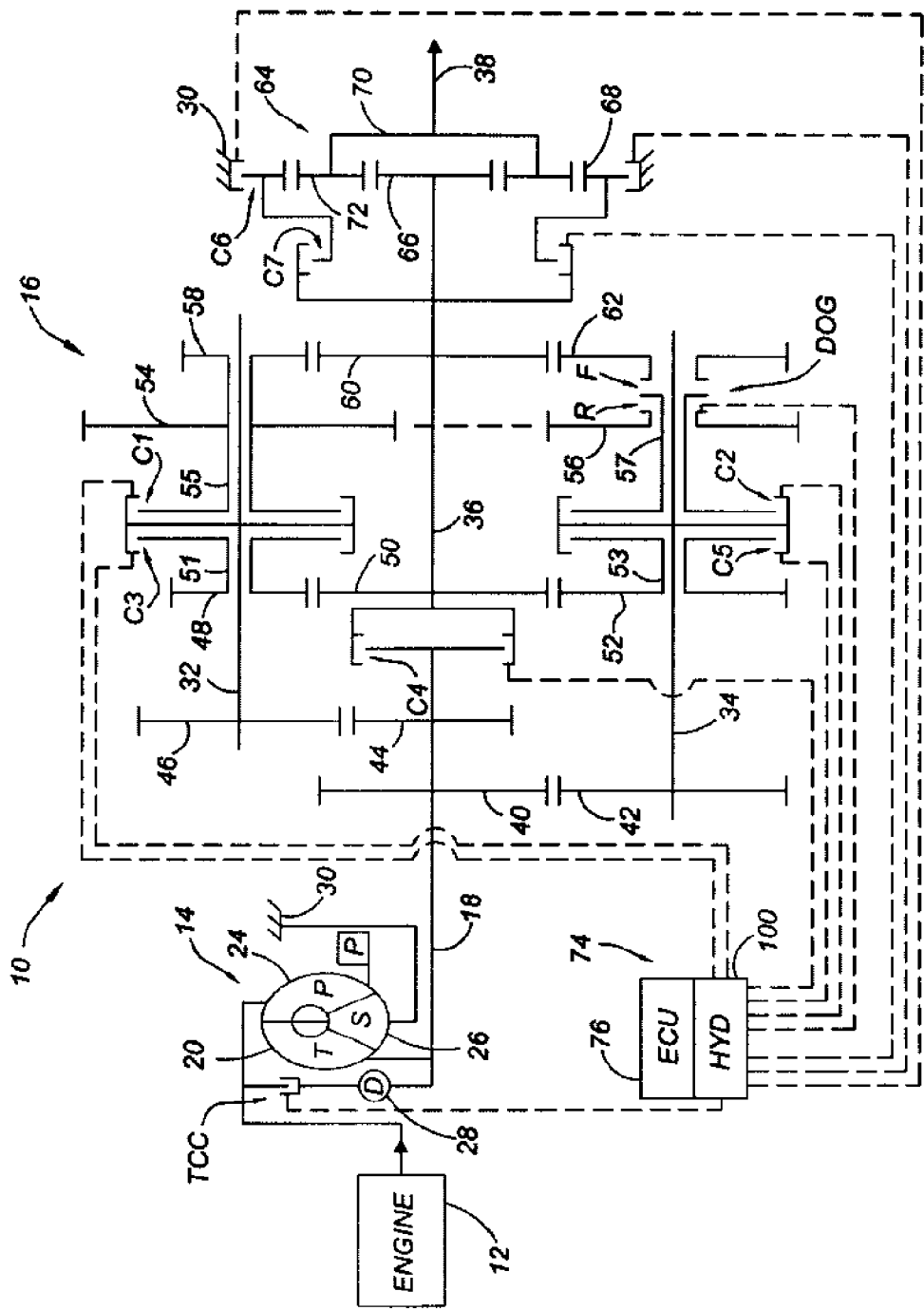
FIG. 1 is a schematic representation of a countershaft transmission having torque-transmitting mechanisms engaged and disengaged via an electro-hydraulic control system within the scope of the invention.

Referring to the drawings, wherein like reference numbers represent the same or corresponding parts throughout the several views, there is shown in FIG. 1 a powertrain 10. The powertrain 10 includes a power source or engine 12, a torque converter 14 and a countershaft transmission 16. The torque converter 14 is connected with the engine 12 and with a transmission input member 18 via a turbine 20. Selective engagement of a torque converter clutch TCC allows the engine 12 to be directly connected with the input shaft 18, bypassing the torque converter 14. The input member 18 is typically a shaft, and may be referred to as an input shaft herein. The torque converter 14 includes the turbine 20, a pump 24 and a stator 26. The converter stator 26 is grounded to a casing 30 through a typical one-way clutch that is not shown. A damper 28 is operatively connected to the engaged torque converter clutch TCC for absorbing vibration.

The transmission 16 includes a plurality of intermeshing gears, a first countershaft 32, a second countershaft 34, an intermediate shaft 36 and an output member 38, which may be a shaft. The transmission 16 further includes a plurality of torque-transmitting mechanisms, including the torque converter clutch TCC, six rotating clutches: C1, C2, C3, C4, C5 and C7; and one stationary clutch C6. Torque is transferred from the input member 18 to the output member 38 along various powerflow paths through the transmission 16 depending on which of the plurality of selectively engagable torque-transmitting mechanisms are engaged.

Clutch C4 is selectively engagable to connect the input member 18 for rotation with the intermediate shaft 36. Gear 40 rotates with the input member 18 and continuously intermeshes with gear 42, which rotates with the second countershaft 34. Gear 44 rotates with input member 18 and continuously intermeshes with gear 46, which rotates with the first countershaft 32. Gear 48 rotates with sleeve shaft 51 which is concentric with first countershaft 32 and is selectively connectable with the first countershaft 32 by engagement of clutch C3. Gear 48 continuously intermeshes with gear 50, which rotates with intermediate shaft 36. Gear 50 also continuously intermeshes with gear 52, which rotates with sleeve shaft 53, which is concentric with second countershaft 34 and is selectively connectable for rotation with second countershaft 34 by engagement of clutch C5. Gear 54 rotates with sleeve shaft 55 which is concentric with and selectively connectable for rotation with first countershaft 32 by engagement of clutch C1. Gear 54 continuously intermeshes with gear 56 (in a different plane than the two-dimensional schematic, as indicated by the dashed lines therebetween). Gear 56 rotates about and is selectively connectable for rotation with a sleeve shaft 57 by the positioning of a dog clutch DOG in a reverse position indicated as R. The sleeve shaft 57 is selectively connectable for rotation with the second countershaft 34 by engagement of clutch C2. Gear 58 rotates with the sleeve shaft 55 and continuously intermeshes with gear 60, which rotates with the intermediate shaft 36. Gear 60 continuously intermeshes with the gear 62, which is selectively connectable for rotation with the sleeve shaft 57 by positioning of the dog clutch DOG in a forward position indicated by F in the FIG. 1.

The transmission 16 further includes a planetary gear set 64 with a sun gear member 66 connected for rotation with the intermediate shaft 36, a ring gear member 68 selectively connectable for rotation with the intermediate shaft 36 by engagement of clutch C7, a carrier member 70 connected for rotation with the output member 38 and rotatably supporting planet gears 72 that intermesh with both the sun gear member 66 and the ring gear member 68. A clutch C6 is selectively engagable to ground the ring gear member 68 to the stationary member 30.

In a preferred embodiment, the following gear tooth counts are used: gear 40 has 39 teeth; gear 42 has 37 teeth; gear 46 has 40 teeth; gear 44 has 31 teeth; gear 48 has 34 teeth; gear 50 has 31 teeth; gear 52 has 34 teeth; gear 54 has 62 teeth; gear 56 has 46 teeth; gear 58 has 26 teeth; gear 60 has 44 teeth; gear 62 has 26 teeth; ring gear member 68 has 85 teeth and sun gear member 66 has 35 teeth. By the selective engagement of the torque-transmitting mechanisms TCC, C1, C2, C3, C4, C5, C6, C7 and DOG according to the table of FIG. 3, and assuming the tooth counts listed above, the following sample numerical speed ratios are attained between the input member 12 and the output member 14 for the following speed ratio ranges: second reverse speed ratio range (R2): 2.18; first reverse speed ratio range (R1): 7.42; first forward speed ratio (1st 7.49; second forward speed ratio (2nd): 5.51; third forward speed ratio (3rd): 4.03; fourth forward speed ratio (4th): 2.97; fifth forward speed ratio (5th): 2.18; sixth forward speed ratio (6th): 1.61; seventh forward speed ratio (7th); 1.18; eighth forward speed ratio (8th): 1.00; ninth forward speed ratio (9th): 0.87. Alternate solenoid-energizing schemes are available for the first, third, fifth and seventh speed ratio ranges with one or more of the logic valves in different positions for the same range. For example, three different alternate seventh forward speed ratios (7th'), (7th") and (7th''') are available by energizing solenoids associated with different ones of the logic valves X, Y, Z and W, as discussed below and indicated in FIG. 3.

Figure 2A:
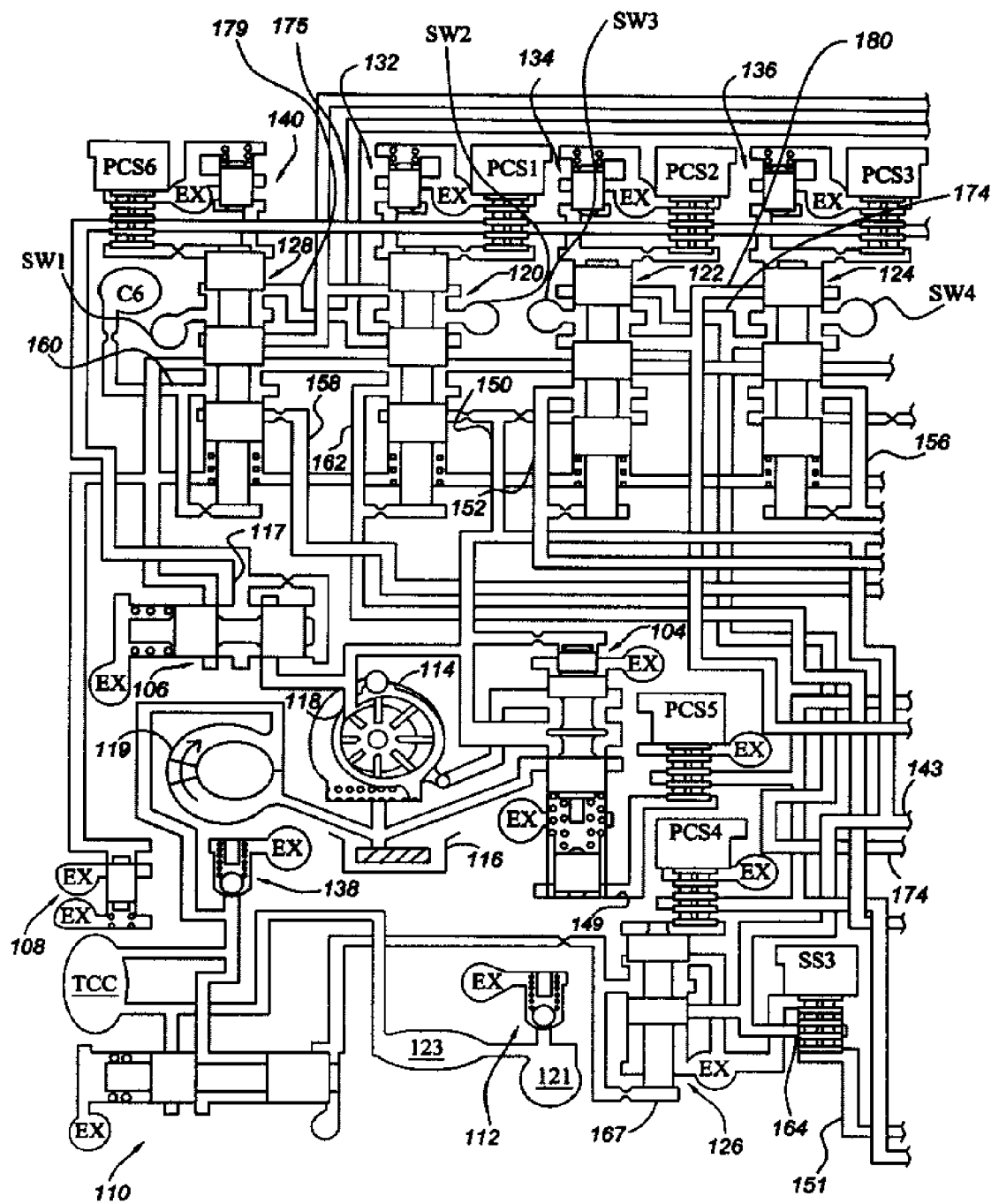
FIGS. 2A and 2B are a schematic representation of a hydraulic control portion of the electro-hydraulic control system of FIG. 1 having valves to control engagement and disengagement of the torque-transmitting mechanisms of the transmission of FIG. 1.
Figure 2B:
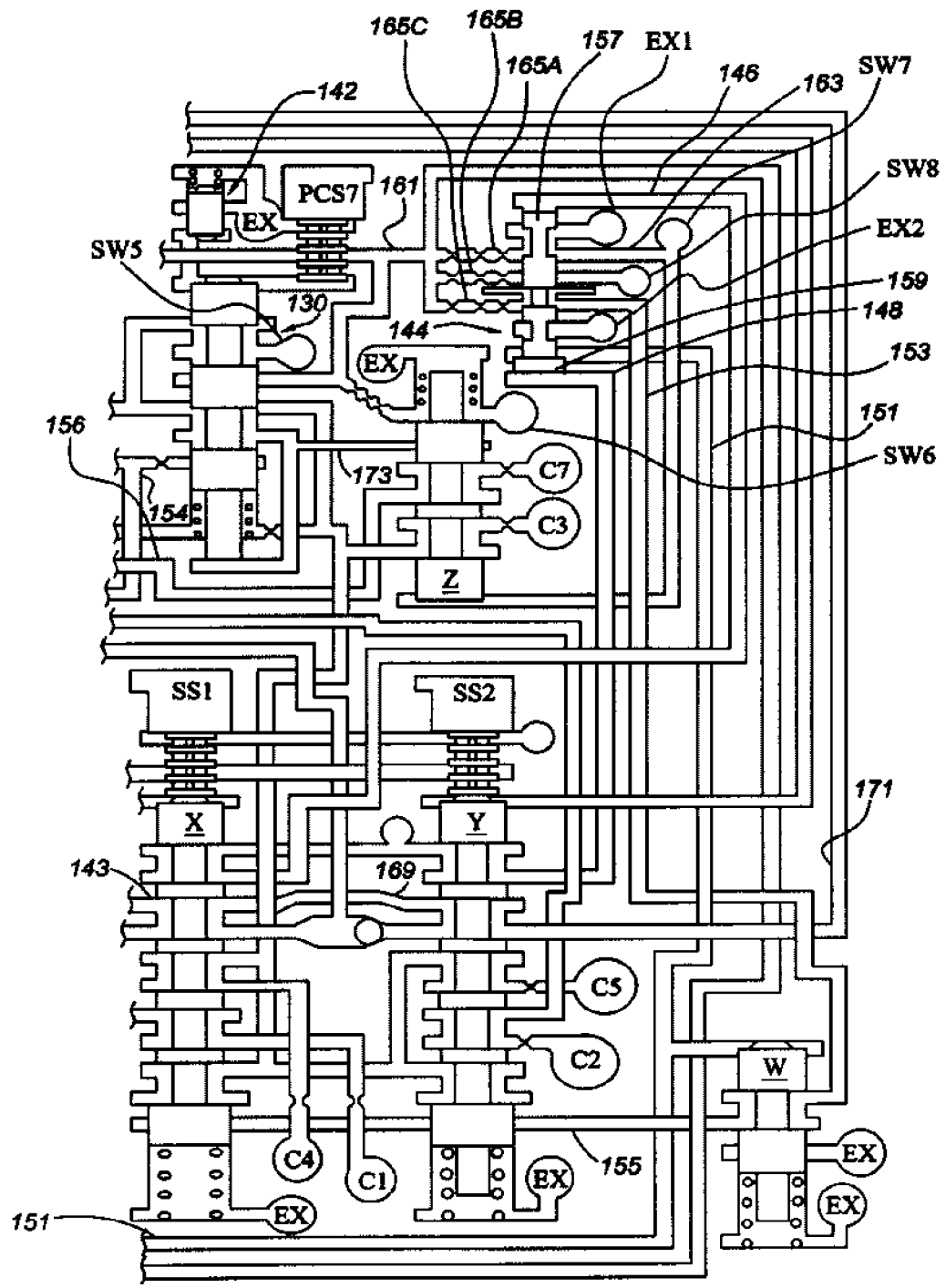

The selective engagement and disengagement of the torque-transmitting mechanisms is controlled by an electro-hydraulic control system 74, which is shown in further detail in FIGS. 2A and 2B. The electro-hydraulic control system 74 includes an electronic controller 76, which may be one or more control units and is referred to as ECU in FIG. 1, as well as a hydraulic control portion 100 referred to as HYD in FIG. 1. The electronic controller 76 is programmable to provide electrical control signals to the hydraulic control portion 100 to establish the fluid pressures that control engagement and disengagement of the torque-transmitting mechanisms TCC, C1, C2, C3, C4, C5, C6, C7 and DOG.

Referring to FIGS. 2A and 2B, the hydraulic control portion 100 includes a main regulator valve 104, a control regulator valve 106, an EBF (exhaust back flow) regulator valve 108, a converter flow valve 110, and a lube regulator valve 112. The main regulator valve 104 is in fluid communication with a hydraulic pump 114, such as a variable volume pump, that draws fluid from a reservoir 116 for delivery to a main passage 118. The control regulator valve 106 is in fluid communication with the main regulator valve 104, and establishes a reduced control pressure within passage 117, which is then communicated to other valves described below, depending upon their position. The EBF regulator valve 108 is operable to vent pressurized fluid within passage 117 to exhaust should an over pressurized condition occur. Pump 119 is an engine-driven pump that also draws fluid from reservoir 116 and that controls the lubrication pressure to a lubrication system 121 and provides cooling fluid to a transmission cooling system 123.

The hydraulic control portion 100 includes many solenoid valves, such as variable pressure type solenoid valves PCS1, PCS2, PCS3, PCS4, PCS5, PCS6, and PCS7, and shift-type (i.e., on/off type) solenoid valves SS1, SS2 and SS3. Each solenoid valve is in electric signal communication with the control unit 76 and is actuated upon receipt of a control signal therefrom. The solenoid valves PCS1, PCS7 and PCS5 are normally high or normally open-type solenoid valves, while the remaining solenoid valves PCS2, PCS3, PCS4, PCS6, SS1, SS2 and SS3 are normally low or normally closed-type solenoid valves. As is well known, an open solenoid valve will distribute output pressure in the absence of an electrical signal to the solenoid. As used herein, a normally high-type solenoid is energized by a control signal to be placed in and to remain in a closed position, while a normally low-type valve is energized to be placed in and to remain in a closed position.

The hydraulic control portion 100 also includes a plurality of trim valves 120, 122, 124, 126, 128 and 130. Trim valve 120, solenoid valve PCS1 and a spring-biased relief valve 132 are a first trim system that, as will be further explained below, is multiplexed to control engagement and disengagement of both clutch C1 and clutch C4. Trim valve 122, solenoid valve PCS2 and accumulator valve 134 are a second trim system that is multiplexed to control engagement and disengagement of both clutch C2 and C5. Trim valve 124, solenoid valve PCS3 and accumulator valve 136 are a third trim system that is multiplexed to control engagement and disengagement of both clutch C3 and C7 (for clutch C7, only for some speed ratios). Trim valve 126, solenoid valve PCS4, converter flow valve 110 and accumulator valve 138 are a fourth trim system that controls engagement of the torque-converter clutch TCC. Trim valve 128, solenoid valve PCS6 and accumulator valve 140 are a fifth trim system that controls engagement and disengagement of clutch C6. Trim valve 130, solenoid valve PCS7 and accumulator valve 142 are a sixth trim system that controls engagement of clutch C7 in those speed ratios for which the third trim system is not controlling. For each trim system, actuation of the associated solenoid valve causes actuation of the respective trim valve and clutch (or one of the respective clutches in the case of multiplexed trim valves). Solenoid valve PCS5 and the main regulator valve 104 control the main pressure level in main passage 118 from the pump 114.

The hydraulic control portion 100 further includes logic valves X, Y, Z and W, and a dog clutch actuator valve 144. Solenoid SS1 receives an electrical control signal from the control unit 76 to actuate or shift, thereby shifting logic valve X. The position of logic valve X controls in part the position of dog clutch actuator valve 144, as the downward shift on the logic valve X (moving from a spring-set position to a pressure-set position) caused by energizing solenoid SS1 allows pressurized fluid provided from passage 118 in passage 143 to pass through the logic valve X into passage 146 in communication with the dog clutch actuator valve 144. Solenoid valve SS2 receives an electrical control signal from the control unit 76 to actuate or shift, thereby shifting logic valve Y, allowing pressurized fluid provided from passage 118 in passage 143 to pass through logic valves X and Y into outlet passage 148 in communication with dog clutch actuator valve 144. Solenoid valve SS3 receives an electrical control signal from the control unit 76 to actuate or shift, thereby allowing pressurized fluid from passage 164 to outlet passage 151 in communication with both logic valve W and dog clutch actuator valve 144. The pressurized fluid in passage 151 causes the logic valve W to shift downward in FIG. 2B, allowing fluid in passage 155 to be exhausted.

The position of logic valve Z is controlled by the position of the dog clutch actuator valve 144. (It should be appreciated that the dog clutch actuator valve 144 has two separately movable valve components, a spool valve 157 and a plug valve 159.) Specifically, when the dog clutch actuator valve 144 is in a reverse position (as depicted in FIG. 2B) controlled pressure fluid provided to passage 161 from passage 117 is not provided to logic valve Z through passage 163. However, when the dog clutch actuator valve is in either the neutral position or the forward position, the controlled pressure fluid from passage 161 is provided to passage 163 through restricted passage 165A to move the logic valve Z from a spring-set position to a pressure-set position. Restricted passage 165B is in fluid communication with switch SW5 and restricted passage 165C is in fluid communication with passage 153. Two exhaust ports, EX1 and EX2, are in fluid communication with the dog clutch actuator valve 144 and two switches SW7 and SW8 are in communication with the valve 144 to monitor its position based on pressure readings.

Pressure Switch Diagnostic System

Electrical signals are sent to the electronic controller 76 based on fluid pressure in the hydraulic control portion 100 to provide feedback information such as information indicative of valve positions. Various pressure sensitive switches, also referred to as pressure switches, which provide such feedback are indicated as pressure switches SW1, SW2, SW3, SW4, SW5, SW6, SW7 and SW8 in FIGS. 2A and 2B. Each pressure switch can monitor and report a high logic state and a low logic state, corresponding with a relatively high pressure and low pressure, respectively, of the fluid at the switch. The pressure switches are configured to report the high logic state at or above a predetermined pressure and the low logic state below the predetermined pressure. Accordingly, as used herein, a "relatively high pressure" is a pressure at or above a predetermined pressure and a "relatively low pressure" is a pressure below the predetermined pressure. The ability to monitor the above-mentioned valves and detect a change, or lack of change, in valve position is of importance to provide continuous and reliable operation of the transmission 16.

The pressure switches SW1, SW2, SW3, SW4, SW5, SW6, SW7 and SW8, and the electronic controller 76 that analyses the state of the pressure switches form a diagnostic system for the transmission 16. Each pressure switch SW1, SW2, SW3, SW4, SW5, SW6, SW7 and SW8 is operatively connected with the controller 76 with a transfer conductor (e.g., an electrical wire) capable of carrying electrical signals therebetween. The controller 76 contains data representing the expected logic state of each of the pressure switches in each of the speed ratio ranges in which the transmission 16 operates. If one or more of the pressure switches detects and reports a logic state to the controller 76 that does not correspond to the expected logic state of that particular pressure switch in the particular speed ratio in which the transmission 16 is operating, the controller 76 will determine whether it is necessary to shift the transmission 16 to a different speed ratio range, including to one of the predetermined drive-home modes (also referred to as failure modes), discussed below, until the transmission can be maintenanced.

It should be appreciated that extensive multiplexing is used to enable at least some of the switches to monitor the position of more than one valve, thus minimizing the number of required components. Several of the pressure switches are multiplexed to detect the positions of both a trim valve and a logic valve. Specifically, Pressure switches SW3 and SW4 are multiplexed with trim valves 122 and 124 as well as logic valve X. Passage 174 and passage 180 establish fluid communication between logic valve X and trim valves 122 and 124. When logic valve X is in a spring-set position, pressurized fluid from passage 118 is delivered in passage 174 to the trim valves 122 and 124. When trim valve 122 is in a pressure-set position, the pressurized fluid in passage 174 is not in communication with pressure switch SW3. Instead, exhausting passage 180 is in communication with pressure switch SW3, which reports a low logic state for diagnostic purposes. When trim valve 122 is in a spring-set position, the pressurized fluid in passage 174 is in communication with pressure switch SW3, which reports a high logic state for diagnostic purposes. When trim valve 124 is in a spring-set position, pressurized fluid in passage 174 is blocked by the middle land of the trim valve 124 from communicating with pressure switch SW4. Instead, exhausting fluid in channel 180 is communicated to pressure switch SW4, which reports a low logic state for diagnostic purposes. When trim valve 124 is in a pressure-set position, pressurized fluid in passage 174 is in communication with pressure switch SW4, which reports a high logic state for diagnostic purposes. Fluid in passage 180 is blocked from communication with pressure switch SW4.

When logic valve X is in a pressure-set position, pressurized fluid from channel 118 is blocked by a land in logic valve X from communicating with passage 174, which exhausts. Control pressure fluid from passage 117 is communicated to passage 180. When trim valve 122 is in a spring-set position, the unpressurized fluid in passage 174 is in communication with pressure switch SW3, which reports a low logic state for diagnostic purposes. When trim valve 122 is in a pressure-set position, the unpressurized fluid in passage 174 is blocked from communication with pressure switch SW3. Instead, the control pressure fluid in passage 180 communicates with switch SW3, which reports a high logic state for diagnostic purposes. When trim valve 124 is in a spring-set position, the control pressure fluid in passage 180 is in communication with pressure switch SW4, which reports a high logic state for diagnostic purposes. When trim valve 124 is in a pressure set position, the exhausting passage 174 is in communication with pressure switch SW4, which reports a low logic state for diagnostic purposes. As is evident from the above, a change in position of the logic valve X causes a change in logic state reported by the pressure switches SW3 and SW4, regardless of the position of the trim valves 122 and 124 (assuming the trim valves do not also change position when the logic valve X changes position).

The controller 76 monitors the state of the pressure switches SW3 and SW4 to determine if the trim valves 122 and 124 are failing to apply or to release the clutches C2, C5 and C3, C7, respectively, as commanded, and whether logic valve X is failing to move to either a spring-set (falling-on) or a pressure-set (failing-off) position. That is, when the controller 76 has commanded a certain speed ratio range by energizing a certain combination of solenoid valves, as set forth in FIG. 3, if either or both of the pressure switches SW3 and SW4 reports a logic state that is not consistent with that expected in the commanded speed ratio range, the controller 76 will determine that one or both of the trim valves 122 and 124 or logic valve X is failing to change position in response to a respective electrical signal (or the cessation of an electrical signal) sent to a respective solenoid valve PCS2, PCS3 or SS1.

Additionally, pressure switches SW1 and SW2 are multiplexed with trim valves 120 and 128 and logic valve Y. Passage 171 and passage 179 establish fluid communication between logic valve Y and trim valves 120 and 128. When logic valve Y is in a spring-set position, pressurized fluid from passage 118 fed through passage 143 and passage 169 to passage 171 is in communication with trim valves 120 and 128. Passages 175 and 179 are exhausting. When trim valve 120 is in a spring set position, the pressurized fluid in passage 171 is in communication with pressure switch SW2, which reports a high logic state for diagnostic purposes. When trim valve 120 is in a pressure set position, a land on trim valve 120 blocks passage 171 from communication with pressure switch SW2. Instead, exhausting fluid in passage 175 is in communication with pressure switch SW2, which reports a low logic state for diagnostic purposes. When trim valve 128 is in a spring-set position, the pressurized fluid in passage 171 is blocked by a land on trim valve 128 from communication with pressure switch SW1. Instead, exhausting fluid in passages 175 and 179 communicates with pressure switch SW1, which reports a low logic state for diagnostic purposes.

When logic valve Y is in a pressure-set position, passage 175 communicates control pressure fluid routed from passage 117 to the trim valves 120 and 128, and passage 171 exhausts. When trim valve 128 is in a spring-set position, control pressure fluid in passage 175 and 179 communicate with switch SW1, which reports a high logic state for diagnostic purposes. When trim valve 128 is in a pressure set position, a land on trim valve 128 blocks passage 179 from communication with pressure switch SW1. Instead, exhausting passage 171 is in communication with pressure switch SW1, which reports a low logic state for diagnostic purposes. When trim valve 120 is in a spring-set position, a land on trim valve 120 blocks the control pressure fluid in passage 175 from communication with pressure switch SW1. Instead, exhausting passage 171 communicates with switch SW1, which reports a low logic state for diagnostic purposes. When trim valve 120 is in a pressure set position, control pressure fluid in passage 175 communicates with pressure switch SW1, which reports a high logic state for diagnostic purposes. Exhausting passage 171 is blocked from communication with switch SW1 by a land on trim valve 120. As is evident from the above, a change in position of logic valve Y causes a change in logic state reported by the pressure switches SW1 and SW2, regardless of the position of trim valves 120 and 128 (assuming the trim valves do not also change position when the logic valve Y changes position).

The controller 76 monitors the state of the pressure switches SW1 and SW2 to determine if the trim valves 128 and 120, respectively, are failing to apply or release the clutches C6 and C1 or C4 as desired, and whether the logic valve Y is failing to move to either a spring-set position (failing-on) or to a pressure-set position (failing-off). That is, when the controller 76 has commanded a certain speed ratio range by energizing a certain combination of solenoid valves, as set forth in FIG. 3, if either or both of the pressure switches SW1 and SW2 report a logic state that is inconsistent with that expected in the commanded speed ratio range, the controller 76 will determine that one or both of the trim valves 120 and 128 or logic valve Y is failing to change position in response to a commanded electrical signal (or the cessation of an electrical signal) sent to the respective solenoid valve PCS1, PCS6 or SS2 associated with the trim valve 120, 128 or logic valve Y, respectively.

Pressure switch SW5 is used for detecting the position of trim valve 130. When trim valve 130 is in a spring-set position, a land on trim valve 130 blocks control pressure fluid from communication with pressure switch SW5. Instead, exhaust fluid in passage 182 communicates with switch SW5, which reports a low logic state for diagnostic purposes. When trim valve 130 is in a pressure-set position, control pressure fluid from passage 117 through passage 161 communicates with pressure switch SW5, which reports a high logic state for diagnostic purposes. If the pressure switch SW5 does not report the expected logic state for a commanded speed ratio range, the controller 76 determines whether the trim valve 130 is failing to change position in response to a change in the electrical signal commanded to solenoid valve PCS6.

Pressure switch SW6 is used for detecting the position of logic valve Z. When logic valve Z is in a spring-set position, control pressure fluid from passage 117 fed through passage 161 is able to exhaust through the exhaust port EX adjacent the logic valve Z, and the pressure switch SW6 reports a low logic state for diagnostic purposes. When logic valve Z is in a pressure-set position, a land on logic valve Z blocks exhaust of the control pressure fluid, and the switch SW6 reports a high logic state for diagnostic purposes. If the pressure switch SW6 does not report the expected logic state for a commanded speed ratio range, the controller 76 determines whether the logic valve Z is failing to change position in response to a change in the position of the dog clutch actuator valve 144, which controls the position of the logic valve Z.

Pressure switches SW7 and SW8 are used for detecting the position of the three-position dog clutch actuator valve 144. When the dog clutch actuator valve 144 is in the reverse position R, control pressure fluid fed through passage 165A is in communication with exhaust port EX1, so pressure switch SW7, which is also in communication with exhaust port EX1, reports a low logic state for diagnostic purposes. A land on dog clutch actuator valve 144 blocks pressure switch SW8 from exhausting through the cavity formed by the portion of the central bore (which is attached to a sump) shown just below pressure switch SW8, so control pressure fluid fed through passage 165B causes pressure switch SW8 to report a high logic state for diagnostic purposes.

When dog clutch actuator valve 144 is in a forward position, the spool valve 157 shifts upward with respect to the reverse position shown in FIG. 3, and a land on spool valve 157 blocks control pressure fluid in passage 165A from communication with exhaust port EX1. Control pressure fluid is fed to passage 163 and switch SW7, which reports a high logic state for diagnostic purposes. Control pressure fluid fed through passage 165B is able to exhaust, and switch SW8 reports a low logic state for diagnostic purposes.

If either or both of the pressure switches SW7 and SW8 do not report the expected logic state for a commanded speed ratio range, the controller 76 determines whether the dog clutch actuator valve 144 is failing to change position in response to a change in the position of logic valve X or Y or a change in electrical signal sent to solenoid valve SS3 (all of which affect the position of the dog clutch actuator valve 144). For example, such an inconsistency with expected logic states of the pressure switches SW7 and SW8 may indicate that the dog clutch actuator valve 144 is getting a stuck signal pressure (i.e., pressurized fluid) in passage 151 due to energizing of solenoid valve SS3 to attempt to move the dog clutch actuator valve 144 to the reverse or to the forward position, (stuck apply) rather than the desired apply and release of hydraulic pressure to change position of the dog clutch actuator valve 144 (as will be confirmed by the pressure switches SW7 and SW5) to minimize overloading of the dog clutch DOG of FIG. 1.

Referring to FIG. 3, a table shows the steady-state conditions of the following valves during available speed ratios (also referred to as ranges): logic valves W, X, Y and Z, dog clutch actuator valve 144, and pressure control solenoid valves PCS1, PCS2, PCS3, PCS4, PCS5, PCS6 and PCS7.

With respect to the logic valves W, X, Y and Z, an "0" in the chart indicates that the valve is in a spring-set position ("unstroked") and a "1" indicates that the valve is in a pressure-set position ("stroked"). With respect to the dog clutch actuator valve 144, an "R" indicates that the dog clutch actuator valve 144 is in a reverse position (with the spool valve 157 and plug valve 159 each in their relatively lowest positions as they appear in FIG. 2B). Switch SW7 will indicate a relatively low pressure condition (i.e., a low logic state) and switch SW8 will indicate a relatively high pressure condition (i.e., a high logic state). Exhaust ports EX1 and EX2 will exhaust. An "F" indicates that the dog clutch actuator valve 144 is in a forward position, with the spool valve 157 in its relatively highest position with an uppermost part of the spool valve 157 shown in FIG. 2B experiencing exhaust pressure fluid in passage 146 and a lowest portion of the plug valve 159 experiencing exhaust pressure in passage 148, and flow of controlled pressure from passage 117 permitted across the valve to passage 163. Switch SW7 will indicate a relatively high pressure condition and switch SW5 will indicate a relatively low pressure condition. Exhaust ports EX1 and EX2 will exhaust. An "N" indicates that the dog clutch actuator valve 144 is in a neutral position in which the upper and lower ends of the valve are subjected to main pressure fluid from passages 146 and 148, respectively, and flow of controlled pressure fluid from passage 117 permitted across the valve 144 to both passages 153 and 163. Switches SW7 and SW8 will both indicate a relatively high pressure condition. Exhaust ports EX1 and EX2 will exhaust.

With respect to the columns in FIG. 3 for the respective pressure control solenoid valves PCS1, PCS2, PCS3, PCS4, PCS6 and PCS7, the clutch listed for a particular speed ratio in a column for a particular solenoid valve indicates that the solenoid valve is in fluid communication with that clutch during that speed ratio. If the box listing the clutch is not shaded, then the solenoid is not energized in the case of a normally closed-type solenoid or is energized in the case of a normally open-type solenoid, and the listed clutch is not engaged. If the box is shaded, then the solenoid is energized in the case of a normally closed-type solenoid or is not energized in the case of a normally-open type solenoid, and the listed clutch is thereby engaged. With respect to PCS5, "MM" indicates that the pressure control solenoid PCS5 is being energized as necessary to control an output pressure in passage 149 that controls a pressure bias on the main regulator valve 104. The pressure control solenoid PCS5, by varying the pressure within passage 149, is operable to vary the operating characteristics of the main regulator valve 104, thereby modulating the pressure within the passage 118. The column of FIG. 2 labeled "Exhaust" indicates which of the clutches are being exhausted (emptied of pressurized fluid) during each of the various speed ratios.

As is apparent from the chart of FIG. 3, the pressure control solenoid PCS1 and the first trim system of which it is a part is multiplexed to control the engagement and disengagement of both clutches C1 and C4. The pressure control solenoid PCS2 and the second trim system of which it is a part is multiplexed to control the engagement and disengagement of both clutches C2 and C5. The pressure control solenoid PCS3 and the third trim system of which it is a part is multiplexed to control the engagement and disengagement of both clutches C3 and C7 (at least for ranges reverse (R2), reverse (R1), startup and neutral conditions, and the first forward speed ratio range (1st). For ranges above the first forward speed ratio range (1st), pressure control solenoid PCS7 controls the engagement and disengagement of clutch C7. Pressure control solenoid PCS4 controls the engagement of the torque-converter clutch TCC. Pressure control solenoid PCS6 controls the engagement of clutch C6, except in speed ratio ranges (7th"), (7th'"), (8th) and (9th). In these speed ratios, clutch C6 is not engaged, and is also not affected by the state of the pressure control solenoid PCS6. The dashed lines in the chart of FIG. 3 indicate that the respective pressure control solenoid and trim system are decoupled from the respective clutch. The column labeled "Exhaust" indicates, for each speed ratio range, clutches that are being exhausted through the logic valves. The remaining clutches that are not engaged are exhausted through the associated trim valves.

FIGS. 2A and 28 depict the hydraulic control portion 100 with the positioning of the valves corresponding to the second reverse speed ratio range (R2) of FIG. 3. When operating in the reverse speed ratio range (R2), the trim valves 122 and 124 are pressure-set and trim valve 120 is spring-set by energizing the solenoids PCS2, PCS3, and PCS1, respectively. The remaining trim valves 126, 128 and 130, and the logic valves X, Y, Z and W remain in a spring-set position. With the above-stated valve configuration, the main pressure in passage 118 is in fluid communication with clutches C2 and C7, which will engage, while clutches C3, C4, and C5 will exhaust. To effect the engagement of clutch C2, pressurized fluid from the passage 150 is communicated to the outlet passage 152 of the trim valve 122. Because it is in the spring-set position, the logic valve Y will communicate the fluid within the passage 152 to the clutch C2. To effect the engagement of the clutch C7, pressurized fluid within the passage 154 is communicated to the outlet passage 156 of the trim valve 124. Because it is in the spring-set position, the logic valve Z will communicate the fluid within passage 156 to the clutch C7. Pressure switches SW1, SW3, SW5, SW6 and SW7 report a low logic state and pressure switches SW2, SW4 and SW8 report a high logic state for diagnostic purposes.

When operating in the first reverse speed ratio range (R1), the trim valves 122 and 128 are pressure-set and trim valve 120 is spring-set by energizing solenoids PCS2, PCS6 and PCS1, respectively. The remaining trim valves 124, 126 and 130, and the logic valves X, Y, Z and W remain in a spring-set position. With the above-stated valve configuration, the main pressure in passage 118 is in fluid communication with clutches C2 and C6, which will engage, while clutches C3, C4, and C5 will exhaust. To effect the engagement of clutch C2, pressurized fluid from the passage 150 is communicated to the outlet passage 152 of the trim valve 122. Because it is in the spring-set position, the logic valve Y will communicate the fluid within the passage 152 to the clutch C2. To effect the engagement of clutch C6, pressurized fluid within passage 158 is communicated to outlet passage 160 of trim valve 128. Because they are in the spring-set position, logic valve X and logic valve Y communicate the fluid within passage 1118 to passage 158.

Pressure switches SW3, SW4, SW5, SW6 and SW7 report a low logic state and pressure switches SW1, SW2 and SW8 report a high logic state for diagnostic purposes.

When starting the engine 12 of FIG. 1 (indicated in FIG. 3 as "startup"), the logic valve X and the trim valve 128 are pressure-set and trim valve 120 is spring-set by energizing the solenoids SS1, PCS6, and PCS1, respectively. The remaining trim valves 120, 124, 126 and 130, and logic valves Y, Z and W remain in a spring-set position. With the above-stated valve configuration, the main pressure in passage 118 is in fluid communication with clutch C6, which will engage, while clutches C1, C3, and C5 will exhaust. To effect the engagement of clutch C6, pressurized fluid within passage 158 is communicated to outlet passage 160 of trim valve 128. The pressure-set position of logic valve X and the spring-set position of logic valve Y allow fluid in passage 118 to be communicated to passage 158.

When operating in the neutral state, indicated as "N" in FIG. 3, the trim valve 128 is pressure-set and trim valve 120 spring set by energizing solenoids PCS6 and PCS1, respectively. The remaining trim valves 124, 126 and 130, and the logic valves X, Y, Z and W remain in a spring-set position. With the above-stated valve configuration, the main pressure in passage 118 is in fluid communication with clutch C6, which will engage, while clutches C3, C4 and C5 will exhaust. To effect the engagement of clutch C6, pressurized fluid within passage 158 is communicated to outlet passage 160 of trim valve 128. Because they are in the spring-set position, logic valve X and logic valve Y communicate the fluid within passage 118 to passage 158. Pressure switches SW4. SW5, SW6 and SW7 report a low logic state and pressure switches SW1, SW2, SW3 and SW8 report a high logic state for diagnostic purposes.

When operating in the first forward speed ratio range (1st), the trim valves 120 and 128 are pressure-set by not energizing solenoid PCS1 and energizing PCS6, respectively. (Note that, because PCS1 is normally open, in a steady state condition, no energizing control signal is required in order to pressure-set the trim valve 120.) The remaining trim valves 122, 124, 126 and 130, and the logic valves X, Y, Z and W remain in a spring-set position. With the above-stated valve configuration, the main pressure in passage 118 is in fluid communication with clutches C1 and C6, which will engage, while clutches C3, C4, and C5 exhaust. To effect engagement of clutch C1, pressurized fluid within passage 150 is communicated to outlet passage 162 of trim valve 120. To effect the engagement of clutch C6, pressurized fluid within passage 158 is communicated to outlet passage 160 of trim valve 128. Because they are in the spring-set position, logic valve X and logic valve Y communicate the fluid within passage 118 to passage 158. Pressure switches SW2, SW4, SW5, SW6 and SW7 report a low logic state and pressure switches SW1, SW3 and SW8 report a high logic state for diagnostic purposes.

When operating in the alternate first forward speed ratio range (1st'), in addition to pressure-setting trim valves 120 and 128 as in the first forward speed ratio range (1st), trim valve 126 is also pressure-set by energizing solenoid valve PCS4. Solenoid valve SS3 is also energized to shift the dog clutch actuator valve 144 to a forward position, thus blocking exhaust of controlled pressure fluid from passage 117 in passage 161 provided to passage 163 through restricted passage 165A, to move the logic valve Z from a spring-set position to a pressure-set position. Solenoid valve SS3 is no longer energized after the dog clutch actuator valve 144 moves to the forward position, as confirmed by the pressure switches SW7 and SW8 shown in communication with the dog clutch actuator valve 144, and control pressure in passage 151 is exhausted, to eliminate unnecessary loading of the dog clutch DOG. With the above-stated valve configuration, the main pressure in passage 118 is in fluid communication with clutches C1 and C6, which will engage. The main pressure in passage 118 is communicated to the converter flow valve 110 via passage 164 across trim valve 126 to passage 167. Clutches C4, and C5 exhaust. Pressure switches SW2, SW4, SW5 and SW8 report a low logic state and pressure switches SW1, SW3, SW6 and SW7 report a high logic state for diagnostic purposes.

When operating in the second forward speed ratio range (2nd), the trim valves 122, 126 and 128 are pressure-set and trim valves 120 and 130 are spring-set by energizing solenoids PCS2, PCS4, PCS6, PCS1 and PCS7, respectively. If the second forward speed ratio range is attained in a shift from the first alternate speed ratio range (1st'), then the dog clutch actuator valve 144 remains in the forward position and the logic valve Z in a pressure-set position due to the previous actuation of the dog clutch actuator valve 144 in the first alternate forward speed ratio range (1st'). The remaining trim valves 120 and 124 remain in a spring-set position. With the above-stated valve configuration, clutches C2, TCC and C6 will be in an engaged position while clutches C4 and C5 exhaust. To effect engagement of clutch C2, pressurized fluid within passage 150 is communicated to outlet passage 152 of trim valve 122. To effect the engagement of clutch C6, pressurized fluid within passage 158 is communicated to outlet passage 160 of trim valve 128. Because they are in the spring-set position, logic valve X and logic valve Y communicate the fluid within passage 118 to passage 158. To effect engagement of clutch TCC, trim valve 126 is pressure-set by energizing solenoid valve PCS4, so that the main pressure in passage 118 is communicated to the converter valve 110 via passage 164 across trim valve 126 to passage 167. Pressure switches SW3, SW4, SW5 and SW5 report a low logic state and pressure switches SW1, SW2, SW6 and SW7 report a high logic state for diagnostic purposes.

When operating in the third forward speed ratio range (3rd), the trim valves 124, 126 and 128 are pressure-set and trim valves 120 and 130 are spring-set by energizing solenoids PCS3, PCS4, PCS6, PCS1 and PCS7, respectively. The dog clutch actuator valve 144 remains in the forward position and the logic valve Z in a pressure-set position due to the previous actuation of the dog clutch actuator valve 144 in the first alternate forward speed ratio range (1st') or in the second forward speed ratio range (2nd), as described above. The remaining trim valve 122 remains in a spring-set position. With the above-stated valve configuration, clutches C3, TCC and C6 will be in an engaged position while clutches C4 and C5 will exhaust. To effect engagement of clutch C3, pressurized fluid from passage 118 within passage 154 is communicated to outlet passage 156 of the trim valve 124 and through the pressure-set logic valve Z to clutch C3. To effect engagement of clutch TCC, trim valve 126 is pressure-set by energizing solenoid valve PCS4, so that the main pressure in passage 118 is communicated to the converter valve 110 via passage 164 across trim valve 126 to passage 167. To effect engagement of clutch C6, pressurized fluid within passage 158 is communicated to outlet passage 160 of trim valve 128. Because they are in the spring-set position, logic valve X and logic valve Y communicate the fluid within passage 118 to passage 158. Pressure switches SW5 and SW8 report a low logic state and pressure switches SW1, SW2, SW3, SW4, SW6 and SW7 report a high logic state for diagnostic purposes.

When operating in the alternate third forward speed ratio range (3rd'), the trim valves 124, 126 and 128 are pressure-set and trim valves 120 and 130 are spring set by energizing solenoids PCS3, PCS4, PCS6, PCS1 and PCS7, respectively, to cause engagement of clutches C3, TCC and C6, as described above with respect to the third forward speed ratio range (3rd). The dog clutch actuator valve 144 remains in the forward position and the logic valve Z in a pressure-set position due to the previous actuation of the dog clutch actuator valve 144 in the first alternate forward speed ratio range (1st') or in the second forward speed ratio range (2nd), as described above. Additionally, solenoid valve SS2 is energized to move the logic valve Y to a pressure-set position, thus allowing main pressure from passage 118 in communication with passage 169 to flow across the logic valve Y to outlet passage 148, moving the plug valve 159 of the dog clutch actuator valve 144 upward. Additionally, the shifting of logic valve Y puts exhaust pressure rather then main pressure into communication with the switches SW2 and SW1 at the trim valves 120 and 128, respectively. Pressure switches SW1, SW2, SW5 and SW5 report a low logic state and pressure switches SW3, SW4, SW6 and SW7 report a high logic state for diagnostic purposes.

When operating in the fourth forward speed ratio range (4th), trim valves 122, 126 and 128 are pressure-set and trim valves 120 and 130 are spring-set by energizing solenoids PCS2, PCS4, PCS6, PCS1 and PCS7, respectively. The dog clutch actuator valve 144 remains in the forward position and the logic valve Z in a pressure-set position due to the previous actuation of the dog clutch actuator valve 144 in the first alternate forward speed ratio range (1st') or in the second forward speed ratio range (2nd), as described above. Solenoid valve SS2 is energized to place logic valve Y in a pressure-set position. With the above-stated valve configuration, clutches C5, TCC and C6 will be in an engaged position while clutches C2 and C4 will exhaust. Engagement of the clutches TCC and C6 are as described above with respect to the third forward speed ratio range (3rd). To effect engagement of clutch C5, solenoid PCS2 is energized to move trim valve 122 to a pressure-set position. Pressurized fluid from passage 118 in communication with passage 150 is communicated to outlet passage 152 across trim valve 122 and then across the pressure-set logic valve Y into communication with clutch C5. Pressure switches SW1, SW2, SW3, SW4, SW5 and SW8 report a low logic state and pressure switches SW6 and SW7 report a high logic state for diagnostic purposes.

When operating in the fifth forward speed ratio range (5th), trim valves 120, 126 and 130 are pressure-set. Solenoid PCS4 is energized to pressure-set trim valve 126, but solenoids PCS1 and PCS7 are not energized to pressure-set trim valves 120 and 130, as these are normally open-type solenoid valves. The dog clutch actuator valve 144 remains in the forward position and the logic valve Z in a pressure-set position due to the previous actuation of the dog clutch actuator valve 144 in the first alternate forward speed ratio range (1st') or in the second forward speed ratio range (2nd), as described above. Solenoid valve SS2 is energized to place logic valve Y in a pressure-set position. With the above-stated valve configuration, clutches C1, TCC and C7 will be in an engaged position while clutches C2 and C4 will exhaust. To effect engagement of clutch C1, pressurized fluid within passage 150 is communicated to outlet passage 162 of trim valve 120. With the logic valve X in the spring-set position, fluid in passage 162 communicates with the clutch C1 across the logic valve X. To effect the engagement of clutch TCC, trim valve 126 is pressure-set by energizing solenoid valve PCS4. To effect the engagement of clutch C7, pressurized fluid within passage 154 is communicated to outlet passage 173 and across the pressure-set logic valve Z to the clutch C7. With the logic valve Y in a pressure-set position, pressurized fluid in passage 152 can exhaust. Pressure switches SW4 and SW8 report a low logic state and pressure switches SW1, SW2, SW3, SW5, SW6 and SW7 report a high logic state for diagnostic purposes.

When operating in the alternate fifth forward speed ratio range (5th'), trim valves 120, 126 and 130 are pressure-set, by energizing solenoid PCS4, but not solenoids PCS1 or PCS7, as described above with respect to the fifth forward speed ratio range (5th). The dog clutch actuator valve 144 remains in the forward position and the logic valve Z in a pressure-set position due to the previous actuation of the dog clutch actuator valve 144 in the first alternate forward speed ratio range (1st') or in the second forward speed ratio range (2nd), as described above. With the above-stated valve configuration, the clutches C1, TCC and C7 are engaged (as described above with respect to the fifth forward speed ratio range (5th)) while the clutches C4 and C5 exhaust. Pressure switches SW1, SW2, SW4 and SW8 report a low logic state and pressure switches SW3, SW5, SW6 and SW7 report a high logic state for diagnostic purposes.

When operating in the sixth forward speed ratio range (6th), trim valves 122, 126 and 130 are pressure-set. Solenoids PCS2 and PCS4 are energized to pressure-set trim valves C2 and TCC, respectively, but solenoid valve PCS7 is not energized, as it is normally open. The dog clutch actuator valve 144 remains in the forward position and the logic valve Z in a pressure-set position due to the previous actuation of the dog clutch actuator valve 144 in the first alternate forward speed ratio range (1st') or in the second forward speed ratio range (2nd), as described above. With the above-stated valve configuration, clutches C2, TCC and C7 will engage while clutches C4 and C5 will exhaust. To effect engagement of clutch C2, pressurized fluid within passage 150 is communicated to outlet passage 152 of trim valve 122. The clutches TCC and C7 are engaged as described above with respect to the fifth forward speed ratio range (5th). Pressure switches SW1, SW3, SW4 and SW8 report a low logic state and pressure switches SW2, SW5, SW6 and SW7 report a high logic state for diagnostic purposes.

When operating in the seventh forward speed ratio range (7th), trim valves 124, 126 and 130 are pressure-set. Solenoids PCS3 and PCS4 are energized to pressure-set trim valves 124 and 126, respectively, but solenoid valve PCS7 is not energized, as it is normally open. The dog clutch actuator valve 144 remains in the forward position and the logic valve Z in a pressure-set position due to the previous actuation of the dog clutch actuator valve 144 in the first alternate forward speed ratio range (1st') or in the second forward speed ratio range (2nd), as described above. With the above-stated valve configuration, clutches C3, TCC and C7 will engage while clutches C4 and C5 will exhaust. To effect engagement of clutch C3, pressurized fluid from passage 118 within passage 154 is communicated to outlet passage 156 of the trim valve 124 and through the pressure-set logic valve Z to clutch C3. The clutches TCC and C7 are engaged as described above with respect to the fifth forward speed ratio range (5th). Pressure switches SW1 and SW8 report a low logic state and pressure switches SW2, SW3, SW4, SW5, SW6 and SW7 report a high logic state for diagnostic purposes.

When operating in the seventh alternate forward speed ratio range (7th'), trim valves and solenoids are energized as described with respect to the seventh forward speed ratio range (7th), except that solenoid valve SS2 is also energized to place the Y valve into a pressure-set position, thus providing pressurized fluid to channel 148, control pressure fluid to channel 175, and exhaust fluid to channel 171, causing the pressure at switch SW2 in communication with trim valve 120 to be exhaust pressure and pressure at switch SW1 in communication with trim valve 128 to be control pressure. Pressure switches SW2 and SW8 report a low logic state and pressure switches SW1, SW3, SW4, SW5, SW6 and SW7 report a high logic state for diagnostic purposes.

When operating in the seventh alternate forward speed ratio range (7th"), trim valves and solenoids are energized as described with respect to the seventh forward speed ratio range (7th), except that solenoid valves SS1 and SS2 are also energized. Energizing solenoid valve SS1 places logic valve X in a pressure-set position to allow pressurized fluid from passage 143 to passage 146 and shifts the dog actuator clutch valve 144 to a neutral position, while preventing the pressurized fluid in passage 143 from reaching passage 174, changing the monitored pressures at the switches SW3 and SW4 associated with trim valves 122 and 124 from high pressure to low pressure and the monitored pressure at the lower switch SW8 associated with the dog clutch actuator valve 144 from exhaust pressure to control pressure. With the dog clutch actuator valve 144 in a neutral position, logic valve Z is in a pressure-set position. Solenoid valve SS2 is also energized to place logic valve Y into a pressure-set position, thus providing pressurized fluid to channel 148 and exhaust fluid to channel 171, causing the pressure at switch SW2 associated with trim valve 120 to be at exhaust pressure and pressure at switch SW1 associated with trim valve 128 to be at control pressure. Pressure switches SW2, SW3 and SW4 report a low logic state and pressure switches SW1, SW5, SW6, SW7 and SW8 report a high logic state for diagnostic purposes.

When operating in the seventh alternate forward speed ratio range (7th'''), trim valves and solenoids are energized as described with respect to the seventh forward speed ratio range (7th), except that solenoid valves SS1, SS2 and SS3 are also energized. Energizing solenoid valves SS1 and SS2 has the effects described above with respect to speed ratio range (7th"). Energizing solenoid valve SS3 as well moves logic valve W to a pressure-set position, thus exhausting fluid in channel 155. Pressure switches SW2 and SW8 report a low logic state and pressure switches SW1, SW3, SW4, SW5, SW6 and SW7 report a high logic state for diagnostic purposes.

When operating in the eighth forward speed ratio range (8th), trim valves 124, 126 and 130 are pressure-set. Solenoid valve PCS4 is energized to pressure-set trim valve 126, but solenoid valves PCS1 and PCS7 are not, as these are normally open-type solenoid valves. Solenoid valves SS8 and SS2 are also energized to move the logic valves X and Y, respectively, to pressure-set positions, causing the dog clutch actuator valve 144 to be in a neutral position. With logic valve X in a pressure-set position, pressurized fluid from passage 143 is communicated to passage 146, while preventing the pressurized fluid in passage 143 from reaching passage 174, causing the monitored pressures at the switch SW3 associated with trim valve 122 to be at exhaust pressure, that at the switch SW4 associated with trim valve 124 to be at control pressure, and that at the lower switch SW8 associated with the dog clutch actuator valve 144 to be at control pressure. With the dog clutch actuator valve 144 in a neutral position, logic valve Z is in a pressure-set position.

With the above-stated valve configuration, clutches C4, TCC and C7 will engage while clutches C1, C2 and C6 will exhaust. To effect engagement of clutch C4, pressurized fluid from passage 150 crosses the pressure-set trim valve 120 to outlet passage 162 and across pressure-set logic valve X into communication with clutch C4. To effect the engagement of clutch TCC, trim valve 126 is pressure-set by energizing solenoid valve PCS4. To effect engagement of clutch C7, pressurized fluid from passage 154 crosses pressure-set trim valve 130 to communicate with passage 173 and then crosses pressure-set logic valve Z into communication with clutch C7. The pressure-set position of logic valve X allows pressurized fluid to pass from passage 143 across the pressure-set logic valve X to passage 146, shifting the dog clutch actuator valve 144 to a neutral state or position, allowing control pressure fluid to contact the lower switch SW8 associated with the dog clutch actuator valve 144. Furthermore, the pressure-set position of logic valve Y allows some of the pressurized fluid crossing logic valve X to be routed to passage 148. Pressure switch SW3 reports a low logic state and pressure switches SW1, SW2, SW4, SW5, SW6, SW7 and SW8 report a high logic state for diagnostic purposes.

When operating in the ninth forward speed ratio range (9th), trim valves 122, 126 and 130 are pressure-set. Solenoid valves PCS2 and PCS4 are energized to pressure-set trim valves 122 and 126, but solenoid valve PCS7 is not energized, as it is normally-open type solenoid valve. Solenoid valves SS1 and SS2 are also energized so that logic valves X and Y, respectively, are in pressure-set positions and the dog clutch actuator valve 144 is in a neutral position. With the above-stated valve configuration, clutches TCC and C7 will engage (as described above with respect to the eighth forward speed ratio range (8th)) as well as clutch C5, while clutches C1, C2 and C6 will exhaust. To effect engagement of clutch C5, pressurized fluid from forward 150 communicates with outlet passage 152 across the pressure-set trim valve 122 and then with clutch C5 through the pressure-set logic valve Y. Because the control system 100 is designed with the dog clutch actuator valve 144 in the neutral position in the higher speed ratio ranges (the alternate seventh forward speed ratio ranges (7th") and (7th'")), as well as in the eighth (8th) and ninth (9th) forward speed ratio ranges, spin losses are reduced in the transmission 10 of FIG. 1. Pressure switch SW2 reports a low logic state and pressure switches SW1, SW3, SW4, SW5, SW6, SW7 and SW5 report a high logic state for diagnostic purposes.

Multiplexing of Trim Systems

As is evident from the Figures and from the above description, the first trim system, which includes solenoid valve PCS1 and trim valve 120, is multiplexed to control engagement of clutches C1 and clutch C4. Shifting of the logic valve X between a spring-set position and a pressure-set position determines which of the clutches C1 and C4 will be engaged via the pressurized fluid fed through the pressure-set trim valve 120 and the logic valve X. As used herein, a valve is "multiplexed" when it has more than one function, such as when it is able to at least partially control engagement of more than one torque-transmitting mechanism.

Furthermore the second trim system, which includes solenoid valve PCS2 and trim valve 124 is multiplexed to control engagement of clutches C2 and C5. Shifting of logic valve Y between a spring-set position and a pressure-set position determines which of the clutches C2 and C5 will be engaged via pressurized fluid fed through the pressure-set trim valve 124 to the logic valve Y.

Still further, the third trim system, which includes the solenoid valve PCS3 and the trim valve 124 is multiplexed to control engagement of the C3 and C7 clutches, at least in speed ratio ranges (R2), (R1), startup, neutral, and first forward speed ratio range (1st). In speed ratio ranges above the first forward speed ratio range (1st), engagement of clutch C7 is controlled by the sixth trim system, which includes solenoid valve PCS7 and trim valve 130. Shifting of logic valve Z between a spring-set position and a pressure-set position determines which of the clutches C3 and C7 will be engaged via pressurized fluid fed through the pressure-set trim valve 124 to the logic valve Z. The shifting of logic valve Z is controlled by the position of the dog clutch actuator valve 144, which in turn is controlled by the positions of the logic valves X and Y and by solenoid valve SS3.

Double Transition Shifts and Skip Shifts

As is evident from FIG. 3 and from the above description, a shift from the fourth forward speed ratio range (4th) to the fifth forward speed ratio range (5th) involves a four clutch, double transition shift. That is, clutches C5 and C6 are disengaged while clutches C1 and C7 are engaged. Thus, even with the multiplexing of the trim systems, this four clutch shift is achieved by the control system 100. A four clutch, double transition shift is also realized. As is evident from FIG. 3, numerous other shifts also involve double transition shifts (i.e., a shift that requires that more than one clutch be engaged or disengaged). The system 100 is also able to accomplish many skip shifts, including a shift from the first reverse speed ratio range (R1) to the first forward speed ratio range (1st); a shift from the second reverse speed ratio range (R2) to the first forward speed ratio range (1st); a shift from the first alternative forward speed ratio range (1st') to the third forward speed ratio range (3rd); a shift from the third forward speed ratio range (3rd) to the fifth forward speed ratio range (5th); a shift from the fifth forward speed ratio range (5th) to the seventh forward speed ratio range (7th); and a shift from the second alternative seventh forward speed ratio range (7th") to the ninth forward speed ratio range (9th).

Logic Valves Used to Control Power Off/Drive-Home Modes

The hydraulic control system 100 is configured to provide a functional "drive-home" system in the event of an interruption or failure in electrical power, which would prevent selective energizing of the solenoid valves. The hydraulic control system 100 is designed to default to two different speed ratio ranges (referred to as failure modes), i.e., there are two different failure modes, depending on which speed ratio range the system 100 is providing when failure occurs. Specifically, if power failure occurs while the transmission 10 is operating in any of the first reverse speed ratio range (R1), the second reverse speed ratio range (R2) or is in neutral (N), the hydraulic control system 100 will automatically operate in a neutral state (i.e., an operating condition which will not allow driving the vehicle in either forward or reverse). This "failure" to a neutral state occurs for several reasons. First, in each of the first reverse speed ratio range (R1), the second reverse speed ratio range (R2) or the neutral (N) speed ratio range, the dog clutch actuator valve 144 is in a reverse position during normal operation (i.e., when electrical energy is available). Additionally, because solenoid valve PCS1 is a normally open-type valve, trim valve 120 will be pressure-set in the absence of an energizing control signal. This causes the pressurized fluid in passage 150 to communicate with outlet passage 162 and be directed through the logic valve X (which allows flow to clutch C1 when in the spring-set position) to clutch C1. Because the trim valves 122, 124, 128 and 130 and the logic valves Z and Y are in spring-set positions during a power failure with the dog clutch actuator valve 144 in a reverse position, trim valve 128 does not allow pressurized fluid flow to clutch C6, logic valve Z does not allow pressurized fluid flow to clutches C3 and C7, and logic valve Y does not allow pressurized fluid flow to clutches C2 and C5. With only clutch C1 engaged, the transmission 10 of FIG. 1 operates in a neutral state.

If power failure occurs when the transmission 10 is in any of the speed ratio ranges (1st), (1st'), (2nd), (3rd), (3rd'), (4th), (5th), (5th'), (6th), (7th), and (7th'), referred to herein as "low" speed ratio ranges, the hydraulic control system 100 will automatically operate in the fifth forward speed ratio range (5th). This "failure" to the fifth forward speed ratio range (5th) occurs for several reasons. First, in each of the first forward speed ratio range (1st) through the seventh alternate forward speed ratio range (7th'), the dog clutch actuator valve 144 is in a forward position during normal operation (i.e., when electrical energy is available), causing logic valve Z to be pressure-set. Additionally, because solenoid valve PCS1 is a normally open-type valve, trim valve 120 will be pressure-set in the absence of an energizing control signal. This causes the pressurized fluid in passage 150 to communicate with outlet passage 162 and be directed through the logic valve X (which allows flow to clutch C1 when in the spring-set position) to clutch C1. Solenoid valve PCS7 is also a normally-open type solenoid valve, so trim valve 130 will be pressure-set in the absence of an electrical control signal and will provide pressurized fluid from passage 154 to outlet passage 173 and through the pressure-set logic valve Z to clutch C7. Because the trim valves 120, 124, and 128 and the logic valves X and Y are in spring-set positions during a power failure with the dog clutch actuator valve 144 in a reverse position, trim valve 128 does not allow pressurized fluid flow to clutch C6, and logic valve Y does not allow pressurized fluid flow to clutches C2 and C5. With only clutches C1 and C75 engaged, the transmission 10 of FIG. 1 operates in the fifth forward speed ratio range, except without engagement of the torque-converter clutch TCC.

If power failure occurs when the transmission 10 is in any of the speed ratio ranges (7th"), (7th'"), (8th), or (9th), referred to herein as "high" speed ratio ranges, the hydraulic control system 100 will automatically operate in the eighth forward speed ratio range (8th). This "failure" to the eighth forward speed ratio range (8th) occurs for several reasons. First, in each of the alternate seventh forward speed ratio range (7th") through the ninth forward speed ratio range (9th), the dog clutch actuator valve 144 is in a neutral position during normal operation (i.e., when electrical energy is available), causing logic valve Z to be pressure-set. When power is interrupted, the neutral position of the dog clutch actuator valve 144 causes logic valves X and Y to remain pressure-set (i.e., the dog clutch actuator valve 144 latches the logic valves X and Y), as they are in each of the alternate seventh forward speed ratio range (7th") through the ninth forward speed ratio range (9th), even though solenoid valves SS1 and SS2 are not energized, because there are no exhaust routes open for the pressurized fluid in passages 146 and 148 acting on logic valves X and Y, and for the controlled pressure fluid acting on logic valves X and Y through the spring-set logic valve W which communicates passage 153 with passage 155. During normal operation, the solenoid SS3 can be energized to place logic valve W in a pressure-set position (either in steady state, or temporarily) to prevent fluid communication between passages 153 and 155, thus preventing the dog clutch actuator 144 from having a latching effect on logic valves X and Y.

The logic valves X and Y also function to "lock out" clutch C6 during forward ratio ranges (7th"), (7th'"), (8th) and (9th). This occurs because, in these operating ranges, the logic valves X and Y are both in pressure-set positions. Thus, logic valve X and logic valve Y prevent pressurized fluid from passage 118 from reaching passage 158, while logic valve Y allows control pressure fluid from passage 117 to passage 179, preventing trim valve 128 from being placed in a pressure-set position by solenoid valve PCS6.

While the best modes for carrying out the invention have been described in detail, those familiar with the art to which this invention relates will recognize various alternative designs and embodiments for practicing the invention within the scope of the appended claims.

The invention claimed is:

1. An electro-hydraulic control system that controls engagement of torque-transmitting mechanisms in a transmission; wherein the control system includes a controller, comprising:
   a pressure switch diagnostic system having first, second, third and fourth pressure switches each having a high and a low logic state;
   first and second logic valves each movable between a respective first position and second position;
   first, second, third and fourth trim valves each movable between a respective first position and second position;
   wherein two of the pressure switches are each multiplexed to report one of the high logic state and the low logic state to the controller in accordance with a relatively high and a relatively low fluid pressure, respectively, at a respective one of two of the trim valves corresponding with the position of the respective one of two of the trim valves and the position of the first logic valve; thereby enabling a determination of a change in position or a failure to change position of the respective one of two of the trim valves or the first logic valve; and
   wherein the other two of the pressure switches are each multiplexed to report one of the high and the low logic state to the controller in accordance with a relatively high and a relatively low fluid pressure, respectively, at a respective one of the other two trim valves corresponding with the position of the respective one of the other two trim valves and the position of the second logic valve; thereby enabling a determination of a change in position or a failure to change position of the respective one of the other two trim valves or of the second logic valve.

2. The electro-hydraulic control system of claim 1, wherein the diagnostic system is characterized by an absence of any other pressure switches used to monitor the position of the four trim valves and the two logic valves.

3. The electro-hydraulic control system of claim 1, wherein the torque-transmitting mechanisms include a dog clutch selectively movable between a reverse, a neutral and a forward position, and further comprising:
   a dog clutch actuator valve selectively movable between three different positions corresponding with and controlling the reverse, neutral and forward positions of the dog clutch;
   wherein the diagnostic system further includes:
      fifth and sixth pressure switches each having a high and a low logic state and in fluid communication with the dog clutch actuator valve at a different respective location, and each operable to report one of the high and the low logic state to the controller in accordance with a relatively high and a relatively low fluid pressure, respectively, corresponding with the position of the dog clutch actuator valve.

4. The electro-hydraulic control system of claim 3, wherein the diagnostic system is characterized by an absence of any other pressure switches used to monitor the position of the dog clutch actuator valve.

5. The electro-hydraulic control system of claim 3, further comprising:
   a fifth trim valve;
   a third logic valve;
   wherein the diagnostic system further includes:
      a seventh pressure switch in fluid communication with the fifth trim valve, and operable to report one of the high and the low logic state to the controller in accordance with a relatively high and a relatively low fluid pressure, respectively, corresponding with the position of the fifth trim valve, thereby enabling a determination of a change in position or a failure to change position of the fifth trim valve; and
      an eighth pressure switch in fluid communication with the third logic valve, and operable to report one of the high and the low logic state to the controller in accordance with a relatively high and a relatively low fluid pressure, respectively, corresponding with the position of the third logic valve, thereby enabling a determination of a change in position or a failure to change position of the third logic valve.

6. The electro-hydraulic control system of claim 5, wherein the diagnostic system is characterized by an absence of any other pressure switches used to monitor the position of the five trim valves, the dog clutch actuator valve and the three logic valves.

7. The electro-hydraulic control system of claim 5, wherein the trim valves are solenoid operated pressure regulated valves.

8. The electro-hydraulic control system of claim 5, in combination with the transmission, wherein the torque-transmitting mechanisms include seven torque-transmitting mechanisms and the dog clutch, and are selectively engagable in different combinations to provide at least nine forward speed ratios and two reverse speed ratios; and wherein the transmission is a countershaft transmission.

9. An electro-hydraulic control system comprising:
five trim valves;
three logic valves;
wherein each of the trim valves and logic valves is selectively movable between respective first and second positions;
a three position dog-clutch actuator valve selectively movable between reverse, neutral and forward positions;
a diagnostic system including eight pressure switches in signal communication with a controller, each operable to report a logic state to the controller indicative of a position of at least one of the trim valves, the logic valve and the dog clutch actuator valve; and wherein some of the pressure switches are multiplexed in selective fluid communication with more than one of the trim valves, the logic valve and the dog clutch actuator valve to report logic states indicative of the positions of more than one valve.

10. The electro-hydraulic control system of claim 9, wherein a first and a second of the pressure switches are each multiplexed with a first of the logic valves with a respective one of a first and a second of the trim valves.

11. The electro-hydraulic control system of claim 10, wherein a third and a fourth of the pressure switches are each multiplexed with a second of the logic valves and with a respective one of a third and a fourth of the trim valves.

12. The electro-hydraulic control system of claim 9, wherein two of the pressure switches are in fluid communication with the dog clutch actuator valve; wherein the combined logic states of the two pressure switches in fluid communication with the dog clutch actuator valve are indicative of the position of the dog clutch actuator valve.

13. The electro-hydraulic control system of claim 9 in combination with a transmission operable in multiple speed ratios; and wherein the controller is operable to determine whether the reported logic states of the pressure switches are consistent with expected logic states corresponding with the speed ratio commanded by the controller.

14. An electro-hydraulic control system in combination with a transmission comprising:
five trim valves;
three logic valves;
wherein each of the trim valves and logic valves is selectively movable between respective first and second positions;
a three position dog-clutch actuator valve selectively movable between reverse, neutral and forward positions;
a diagnostic system including eight pressure switches in signal communication with a controller, each operable to report a logic state to the controller indicative of a position of at least one of the trim valves, the logic valve and the dog clutch actuator valve; and wherein some of the pressure switches are multiplexed in selective fluid communication with more than one of the trim valves, the logic valve and the dog clutch actuator valve to thereby be operable to report logic states indicative of the positions of more than one of the valves; and
wherein the torque-transmitting mechanisms include seven torque-transmitting mechanisms and the dog clutch selectively engagable in different combinations to provide at least nine forward speed ratios and two reverse speed ratios; and wherein the transmission is a countershaft transmission.

* * * * *